United States Patent
Bracke et al.

(10) Patent No.: US 6,604,596 B2
(45) Date of Patent: Aug. 12, 2003

(54) HYDROSTATIC TRACTION DRIVE

(75) Inventors: Helmut Bracke, Haibach (DE); Horst Tobias, Mespelbrunn (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/996,081

(22) Filed: Nov. 28, 2001

(65) Prior Publication Data

US 2002/0070065 A1 Jun. 13, 2002

(30) Foreign Application Priority Data

Dec. 6, 2000 (DE) .......................... 100 60 69

(51) Int. Cl.⁷ .............................. F16H 47/02
(52) U.S. Cl. ...................... 180/242; 180/305
(58) Field of Search ........................ 180/242, 248, 180/245, 305, 307

(56) References Cited

U.S. PATENT DOCUMENTS

| | | | |
|---|---|---|---|
| 3,579,988 A | * 5/1971 | Firth et al. | 180/242 |
| 4,528,871 A | * 7/1985 | Nembach | 180/242 |
| 5,188,193 A | * 2/1993 | Schroeder | 180/242 |
| 5,368,527 A | 11/1994 | Forster | 475/83 |

FOREIGN PATENT DOCUMENTS

| | | | |
|---|---|---|---|
| DE | 42 06 084 A1 | 9/1993 | |
| EP | 0482524 A1 | * 4/1992 | F16H/47/02 |

* cited by examiner

*Primary Examiner*—Lesley D. Morris
*Assistant Examiner*—Matthew Luby
(74) *Attorney, Agent, or Firm*—Webb Ziesenheim Logsdon Orkin & Hanson, P.C.

(57) ABSTRACT

A hydrostatic traction drive includes a first hydrostatic motor and at least one drive unit effectively connected with the motor. The motor is connected with a second motor into a modular unit, and the motors are positioned coaxially with respect to each other. At least one of the motors has a variable displacement. Between the motors and/or between at least one motor and the drive unit that is effectively connected with it, there is a clutch that can be disengaged in operation. On the motor-side of the hydrostatic traction drive, it thereby becomes possible to vary the transmission ratio continuously and without interrupting the traction. The clutch connected between the motors makes it possible to disconnect one of the motors and thereby reduce power loss and wear. Output-side clutches make it possible to disengage drive units from the motors.

16 Claims, 1 Drawing Sheet

HYDROSTATIC TRACTION DRIVE

CROSS REFERENCE TO RELATED APPLICATION

This application corresponds to German Application No. 100 60 679.2 filed Dec. 6, 2000, and herein incorporated by reference in its entirety.

BACKGROUND OF THE INVENTION

1. Field of the Invention

This invention relates generally to a hydrostatic traction drive with a hydrostatic motor and at least one drive unit actively connected to it.

2. Technical Considerations

A traction drive is described in DE 42 06 085 A1. In that case, an axial piston motor with a constant intake volume that does not have its own motor shaft is connected on the output side with a planetary gear train that is oriented coaxially with the axial piston motor and drives the planetary gear train. The output shaft of the engaging and disengaging planetary gear train runs through the center of the axial piston motor.

It is an object of the present invention to provide a compact and improved hydrostatic traction drive of the general type described above but that has a simple construction, can be used over a wide range of speeds, and is suitable for a wide variety of potential applications.

SUMMARY OF THE INVENTION

In a hydrostatic traction drive of the invention, the motor is connected with a second motor into one modular unit and the motors are arranged coaxially to each other. At least one of the motors has a variable displacement. Between the motors and/or between at least one motor and the drive unit to which it is actively connected, there is a clutch that can be engaged and disengaged during operation.

The invention makes possible on one hand a continuously variable transmission ratio on the motor side of the hydrostatic traction drive without interrupting the traction force. The engaging and disengaging mechanical gear trains previously used to expand the speed range can be eliminated. In the low-speed range of a vehicle equipped with the hydrostatic traction drive of the invention, both motors can be initially set for the maximum displacement (intake volume). Changes in speed can be initially made on the primary side. In other words, to increase the speed, the delivery volume of one of the variable pumps feeding the motors can be increased. In this setting, the traction drive produces its maximum drive torque. To further increase the speed, the displacement of the variable motor can be reduced as the quantity of hydraulic fluid fed to the motor remains constant. The hydraulic fluid thereby not used is then available to the other motor so that the output speed of the other motor, and thus the speed of the vehicle, can be increased in the desired manner.

On the other hand, there are additional advantages as a result of the presence of engaging and disengaging clutches in the drive train. A clutch interposed between the motors makes it possible to turn off one of the motors, if necessary, and thereby reduce the power loss and wear. The drive unit can be disengaged from the motors by an output-side clutch. The types of clutches that can be used include both positive clutches, such as dog clutches, as well as non-positive clutches, such as friction clutches or viscous clutches.

In one advantageous configuration of the invention, both motors are flange mounted onto a drive unit that is realized in the form of a drive shaft. A traction drive of this type can be used, for example, as a two-wheel drive.

If there is a power take-off on both sides for the two motors that are connected with each other, an additional drive unit can be connected in addition to the drive unit mentioned above. In one aspect of the invention, this additional drive unit can be a second drive axle, for example. In that case, the motors can be located between two drive axles, and each motor can be coupled with one of the drive axles (all-wheel drive). In that case, with a clutch connected between the motors, it is possible by completely opening the clutch or by initiating a controlled slip (partial opening) to eliminate or reduce strains in the drive train between the two drive axles that can result under certain driving conditions (e.g., steering angle, different tire diameters, etc.). A controlled slip can also be used to divide the drive torques in a desired ratio between the two drive axles. An anti-slip control can also be realized, in which, by means of the clutch, the drive torque for one of the drive axles can be reduced in a controlled manner to prevent spinning or slipping of the drive wheels.

The two motors can also be integrated into one drive axle. In that case, the drive wheels of the drive axle represent drive units which are coupled with the motors, with the interposition of a step-down gearing if necessary or desired. The clutch that is located between the motors can then be used in the sense of a differential lock.

The above-mentioned effects can likewise be achieved if, as an alternative to the positioning of the clutch between the motors, there is a clutch associated with each of the two power take-offs. In addition, both motors can optionally be coupled with both or with only one of the two drive units, as a result of which when the drive axles are used as drive units instead of an all-wheel drive, if desired, a front-wheel drive or rear-wheel drive or even freewheeling (e.g., for towing operation) can be achieved. If the traction drive is used in a drive axle, both motors can be connected to one drive wheel. In this case, too, freewheeling is possible by disengaging the clutch for both motors.

If a clutch is also connected between the motors, one of the motors can be mechanically disengaged.

It is advantageous if an intermediate shaft, in particular a jointed shaft, is located between at least one drive axle and one motor. If both the motors are not flange-mounted on one of the drive axles, the connection to the two drive axles can be made by means of the intermediate shaft. The two motors are thereby integrated into the jointed shaft train.

The invention teaches that it is advantageous if both motors have their own motor shaft, and the two motor shafts are synchronously coupled to each other by a clutch sleeve that is located axially between the motors, or can be coupled to each other by a clutch that is located axially between the motors. It thereby becomes possible to use identical and essentially standardized motors.

In one advantageous configuration of the invention, the motors are realized in the form of hydrostatic axial piston motors that employ a swashplate design and are arranged symmetrically (i.e., "Back to back") with respect to each other.

The construction of the hydrostatic traction drive of the invention can be simplified, and the dimensions minimized, if the two axial piston motors have a common control base receptacle and also have a common hydraulic fluid feed and discharge.

The transmission range of the hydrostatic traction drive of the invention can be increased in one development of the invention in which the displacement of both axial piston motors is variable. It thereby becomes possible to achieve an increased final speed.

In an additional configuration of the invention, at least one of the motors is reversible, which makes a further speed increase possible. In reverse, while the direction of rotation of the first motor remains the same, the direction of flow of the hydraulic fluid can be reversed in the second, reversed motor. Additional hydraulic fluid can thereby be fed to the first motor, i.e., the variable second engine, in reverse, acts as a pump driven by the first motor, the "delivery volume" of which further increases the output speed. Consequently, in this operating state, the transmission range, i.e., the speed range of the hydrostatic traction drive of the invention, can be expanded.

The invention teaches that it is particularly advantageous to use the traction drive in a machine, in particular in construction equipment. On one hand, the operation of such machines at low speed, i.e., on and off the road, requires a high drive torque, and on the other hand, machines of this type must be moved as quickly as possible to the next work site, which requires them to travel at the highest possible speed on the road. The traction drive of the invention can also be used in other types of equipment, such as agricultural equipment, forest management equipment, and municipal vehicles that have one or more drive axles, just to name a few.

BRIEF DESCRIPTION OF THE DRAWINGS

Additional advantages and features of the invention are described in greater detail below with reference to the exemplary embodiments illustrated in the accompanying schematic drawings in which like reference symbols identify like parts throughout.

DESCRIPTION OF THE PREFERRED EMBODIMENTS

Figure 1:
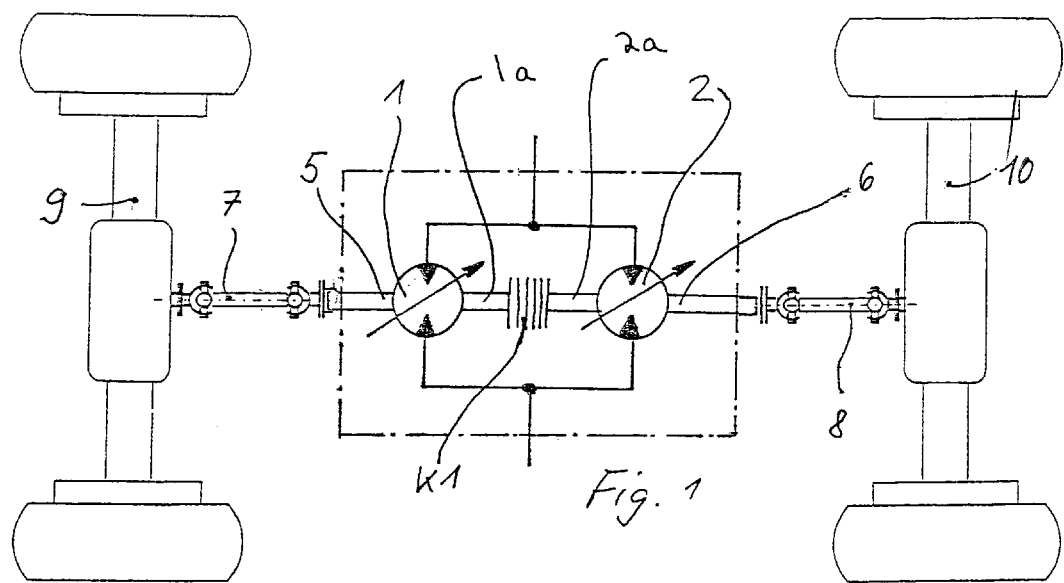
FIG. 1 shows a hydrostatic traction drive of the invention with two drive axles, a central location of the motors, and a clutch between the motors.

FIG. 1 shows an exemplary hydrostatic traction drive of the invention in the form of an all-wheel drive having two hydrostatic motors 1 and 2 which are connected hydraulically in parallel. The motor shafts 1a and 2a of the respective motors 1 and 2 are detachably connected to each other by a clutch K1.

Figure 2:
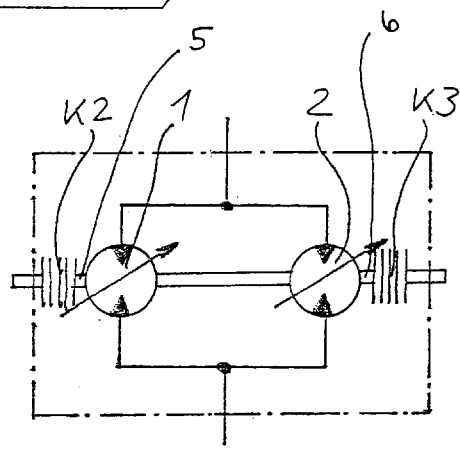
FIG. 2 shows a hydrostatic traction drive of the invention with two output-side clutches.

In the exemplary embodiment illustrated in FIG. 2, instead of the clutch K1 located between the motors 1 and 2, there are two output-side clutches K2 and K3. The motors 1 and 2 are rigidly connected with each other (i.e., they are in permanent synchronization).

The clutch types that can be used in the practice of the invention include both positive clutches, such as dog-clutches, as well as non-positive clutches, such as friction clutches or viscous clutches.

Figure 4:
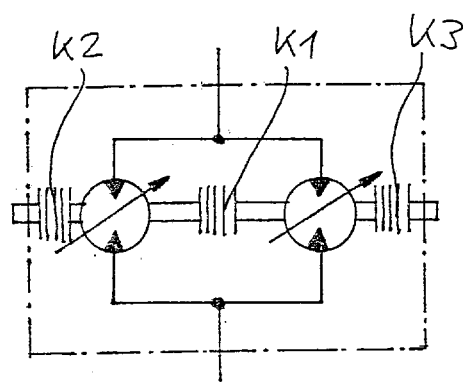
FIG. 4 shows a hydrostatic traction drive of the invention with a clutch between the motors and two output-side clutches.

The exemplary embodiment illustrated in FIG. 4 represents a combination of the exemplary embodiments illustrated in FIGS. 1 and 2. Accordingly, between the two motors 1 and 2 there is a clutch K1, and there are also two output-side clutches K2 and K3.

Figure 3:
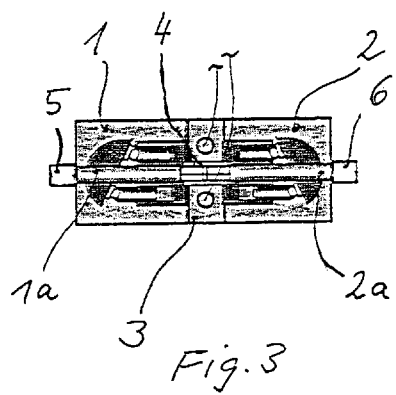
FIG. 3 shows two motors of a traction drive of the invention connected with each other.

The construction and position of the motors 1 and 2 with respect to each other is illustrated in FIG. 3. In one embodiment, the motors are axial piston motors that employ a swashplate design, are positioned coaxially and are connected to each other. The connection is made by flange-mounting the motors 1 and 2 symmetrically with respect to each other in a back-to-back arrangement.

The two motors 1 and 2 can have a common control base receptacle 3 and a common hydraulic fluid feed and discharge. The motors 1 and 2, as shown in the exemplary embodiments illustrated in FIGS. 1 and 4, can be engaged with and disengaged from each other by a clutch K1. It is also possible, however, to provide a continuously synchronized connection by means of a clutch sleeve 4 that connects the motor shafts 1a and 2a.

The two motors 1 and 2 that are connected with each other are provided with respective power take-offs 5 and 6. In the exemplary embodiment illustrated in FIG. 1, the power take-off 5 is connected with an intermediate shaft 7 that is realized in the form of a jointed shaft, and the power take-off 6 is connected with an intermediate shaft 8 that is also realized in the form of a jointed shaft. The intermediate shaft 7 is connected to a drive axle 9, while the intermediate shaft 8 is connected with a drive axle 10.

At least one of the motors 1 or 2, or both motors 1 and 2, can have variable displacements. The variable displacement makes possible a continuous variation of the transmission ratio of the hydrostatic traction drive. In the low-speed range of a vehicle equipped with a hydrostatic traction drive of the invention, both motors 1 and 2 are set to the maximum displacement (intake volume). In this setting, the traction drive achieves its maximum drive torque.

To increase the speed, the displacement of the variable motor is reduced while the quantity of hydraulic fluid supplied remains the same. The hydraulic fluid that is not needed is made available to the other motor, as a result of which the output speed is increased.

If the displacement in both motors 1 and 2 is variable, the transmission range of the hydrostatic traction drive of the invention can be expanded further, thereby making it possible to achieve a higher final speed.

To increase the speed, one of the motors can also be reversed. In reverse, the direction of flow of the hydraulic fluid in the second, reversed motor is reversed while the direction of rotation of the first motor remains the same. Additional hydraulic fluid can thereby be fed to the first motor, i.e., the variable second engine, when in reverse, acts as a pump driven by the first motor, the "delivery volume" of which further increases the output speed. Consequently, in this mode of operation, the transmission range, i.e., the speed range of the hydrostatic traction drive of the invention, is expanded.

The clutch K1 (see FIG. 1) that is connected between the motors 1 and 2 makes it possible to eliminate or reduce strains in the drive train between the two drive axles 9 and 10 that can result under certain operating conditions (e.g., steering angle, different tire diameters, etc.) by completely opening the clutch K1 or by initiating a controlled slip in any conventional manner. A controlled slip can also be executed to split the drive torques in a desired ratio between the two drive axles 9 and 10. It is also conceivable to have an anti-slip control system in which, by means of the clutch K1, the drive torque for one of the drive axles 9 or 10 is reduced to prevent the wheels from slipping or spinning.

This same effect can also be achieved with an arrangement like the one illustrated in FIG. 2, in which respective clutches K2 and K3 are associated with both power take-offs 5 and 6 of the motors 1 and 2. Both motors 1 and 2 can optionally be coupled with both or only with one of the two drive axles 9 or 10. It thereby becomes possible, instead of an all-wheel drive, to have a front-wheel drive or a rear-wheel drive, or even freewheeling (e.g., for towing operations).

If, as illustrated in FIG. 4, the clutch K1 is also located between the motors 1 and 2, one of the motors 1 or 2 can be mechanically disengaged.

The motors 1 and 2 that are connected with each other can also be flange-mounted directly on one of the drive axles 9 or 10. In that case, there is an (elongated) intermediate shaft to drive the other drive axle. Overall, therefore, only one intermediate shaft is necessary for an all-wheel drive of this type.

It is also possible to drive only one of the drive axles 9 or 10, whereby the two motors 1 and 2 that are connected with each other are then preferably flange-mounted on this axle 10. A traction drive of this type represents a two-wheel or single-axle drive system. It is thereby possible to connect another type of drive unit to the end of the two motors 1 and 2 that is farther from the axle, and to tap power.

The illustrated arrangement and the possible connections of the motors 1 and 2 with the clutches K1, K2, and K3 can also be realized inside a drive axle. In that case, the drive units are formed by the drive wheels of the drive axle.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic traction drive, comprising:
   a first hydrostatic motor;
   a second hydrostatic motor connected with the first motor to form a modular unit; and
   at least one drive unit effectively connected with at least one of the first and second motors,
   wherein the first and second motors are positioned coaxially with respect to each other,
   wherein at least one of the motors has a variable displacement, and
   wherein between the motors and/or between at least one motor and the drive unit effectively connected with it there is a clutch that can be engaged and disengaged.

2. The hydrostatic traction drive as claimed in claim 1, wherein both motors are flange-mounted on a drive unit in the form of a drive axle.

3. The hydrostatic traction drive as claimed in claim 1, wherein each motor has a power take-off.

4. The hydrostatic traction drive as claimed in claim 1, wherein the motors are located between two drive units in the form of two drive axles and each motor is operationally connected with one of the drive axles.

5. The hydrostatic traction drive as claimed in claim 4, including an intermediate shaft located between at least one drive axle and at least one motor.

6. The hydrostatic traction drive as claimed in claim 3, including another clutch associated with each of the two power take-offs.

7. The hydrostatic traction drive as claimed in claim 1, wherein the two motors each have their own motor shaft and the two motor shafts are synchronously coupled with each other by a clutch sleeve that is located axially between the motors.

8. The hydrostatic traction drive as claimed in claim 1, wherein the motors are hydrostatic axial piston motors employing a swashplate design, and the motors are positioned symmetrically with respect to each other.

9. The hydrostatic traction drive as claimed in claim 8, wherein the axial piston motors have a common control base receptacle.

10. The hydrostatic traction drive as claimed in claim 8, wherein the axial piston motors have a common hydraulic feed and discharge.

11. The hydrostatic traction drive as claimed in claim 1, wherein both motors have a variable displacement.

12. The hydrostatic traction drive as claimed in claim 1, wherein at least one of the motors is reversible.

13. The hydrostatic traction drive as claimed in claim 1 located in a machine.

14. The hydrostatic traction drive as claimed in claim 5, wherein the intermediate shaft is a jointed shaft.

15. The hydrostatic traction drive as claimed in claim 13, wherein the machine is a piece of construction equipment.

16. The hydrostatic traction drive as claimed in claim 1, wherein the two motors each have their own motor shaft and the two motor shafts are synchronously coupled with each other by a clutch located axially between the motors.

* * * * *

UNITED STATES PATENT AND TRADEMARK OFFICE
CERTIFICATE OF CORRECTION

PATENT NO. : 6,604,596 B2
DATED : August 12, 2003
INVENTOR(S) : Helmut Bracke et al.

It is certified that error appears in the above-identified patent and that said Letters Patent is hereby corrected as shown below:

<u>Title page,</u>
Item [30], Foreign Application Priority Data, "100 60 69" should read
-- 100 60 679.2 --.

Signed and Sealed this

Thirtieth Day of December, 2003

JAMES E. ROGAN
*Director of the United States Patent and Trademark Office*